US008571981B1

United States Patent
Laaser et al.

(10) Patent No.: US 8,571,981 B1
(45) Date of Patent: Oct. 29, 2013

(54) METHOD AND SYSTEM FOR ESTABLISHING ELECTRONIC FINANCIAL TRANSACTIONS BETWEEN ENTITIES

(75) Inventors: William T. Laaser, Palo Alto, CA (US); Rajalakshmi Ganesan, Los Altos Hills, CA (US); James A. Schneider, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 332 days.

(21) Appl. No.: 12/362,153

(22) Filed: Jan. 29, 2009

(51) Int. Cl.
  *G06Q 40/00* (2012.01)
(52) U.S. Cl.
  USPC .................. 705/39; 705/42; 705/70; 705/75; 709/228; 709/227
(58) Field of Classification Search
  USPC ............. 709/227, 228; 340/506; 725/91; 713/156; 455/419; 705/39, 42, 70, 75
  See application file for complete search history.

(56) References Cited

U.S. PATENT DOCUMENTS

| | | | |
|---|---|---|---|
| 2005/0203765 A1* | 9/2005 | Maritzen et al. | 705/1 |
| 2007/0290831 A1* | 12/2007 | Kalinichenko et al. | 340/506 |
| 2008/0155614 A1* | 6/2008 | Cooper et al. | 725/91 |
| 2010/0011208 A1* | 1/2010 | Frankel et al. | 713/156 |
| 2010/0120408 A1* | 5/2010 | Beenau et al. | 455/419 |
| 2010/0262506 A1* | 10/2010 | Zargahi et al. | 705/26 |

* cited by examiner

*Primary Examiner* — Le H Luu
(74) *Attorney, Agent, or Firm* — Park, Vaughan, Fleming & Dowler LLP; Chia-Hsin Suen

(57) ABSTRACT

One embodiment provides a system that facilitates an electronic transaction between a set of entities. During operation, the system discovers a potential interaction between the entities and verifies a set of shared electronic transfer capabilities between the entities. Next, the system facilitates the electronic transaction between the entities by notifying one or more of the entities of the shared electronic transfer capabilities.

1 Claim, 4 Drawing Sheets

METHOD AND SYSTEM FOR ESTABLISHING ELECTRONIC FINANCIAL TRANSACTIONS BETWEEN ENTITIES

BACKGROUND

Related Art

The present embodiments relate to techniques for facilitating interaction between entities. More specifically, the present embodiments relate to a method and system for facilitating electronic transactions between the entities.

Transactions are frequently executed between entities in business, legal, financial, and/or personal domains. For example, a financial transaction may occur as payroll processing between an employer and an employee, a purchase or refund between a customer and a vendor, and/or a fund transfer between an individual and a financial institution. Similarly, a healthcare transaction may correspond to an insurance payment between an insurance provider and a healthcare provider, a bill payment between a patient and a healthcare provider, and/or a prescription processing between a patient and a pharmacy.

However, despite advances in computing and electronic transfer technology, many transactions remain paper-based. Such paper-based transactions may require more time and resources to carry out than electronic transactions. For example, a transaction between a vendor and customer may involve physical transfer and processing of paper-based invoices, checks, inventory lists, and/or other documents associated with the transaction. Along the same lines, a healthcare transaction may involve a number of paper-based bills, waivers, agreements, and/or declarations between an insurance or healthcare provider and a patient.

In addition, entities may commonly encounter impediments in transitioning from paper-based transactions to electronic transactions. In particular, an entity wishing to electronically transact may not know if other entities include electronic transfer capabilities. For example, a vendor wishing to conduct business electronically may not know which of his/her customers share electronic transfer capabilities with the vendor. In addition, customers without electronic transfer capabilities may not realize that electronic transactions may simplify and expedite interaction with the vendor.

Hence, what is needed is a mechanism for encouraging and enabling electronic transactions between entities.

SUMMARY

One embodiment provides a system that facilitates an electronic transaction between a set of entities. During operation, the system discovers a potential interaction between the entities and verifies a set of shared electronic transfer capabilities between the entities. Next, the system facilitates the electronic transaction between the entities by notifying one or more of the entities of the shared electronic transfer capabilities.

In some embodiments, discovering the potential interaction between the entities involves at least one of examining a transaction record between the entities, identifying transaction patterns associated with the entities, and verifying an entity identity of one of the entities.

In some embodiments, the entity identity is verified using at least one of the transaction record and identity data associated with the entity.

In some embodiments, the set of shared electronic transfer capabilities is verified using previous electronic transactions associated with the entities.

In some embodiments, verifying the set of shared electronic transfer capabilities between the entities involves enabling one or more of the shared electronic transfer capabilities for one of the entities.

In some embodiments, the system also carries out the electronic transaction between the entities.

In some embodiments, the electronic transaction corresponds to at least one of a financial transaction, a healthcare transaction, and a business transaction.

In some embodiments, each of the entities corresponds to at least one of a customer, a vendor, a healthcare provider, a healthcare recipient, an individual, a business, and an organization.

BRIEF DESCRIPTION OF THE FIGURES

In the figures, like reference numerals refer to the same figure elements.

DETAILED DESCRIPTION

Figure 1:
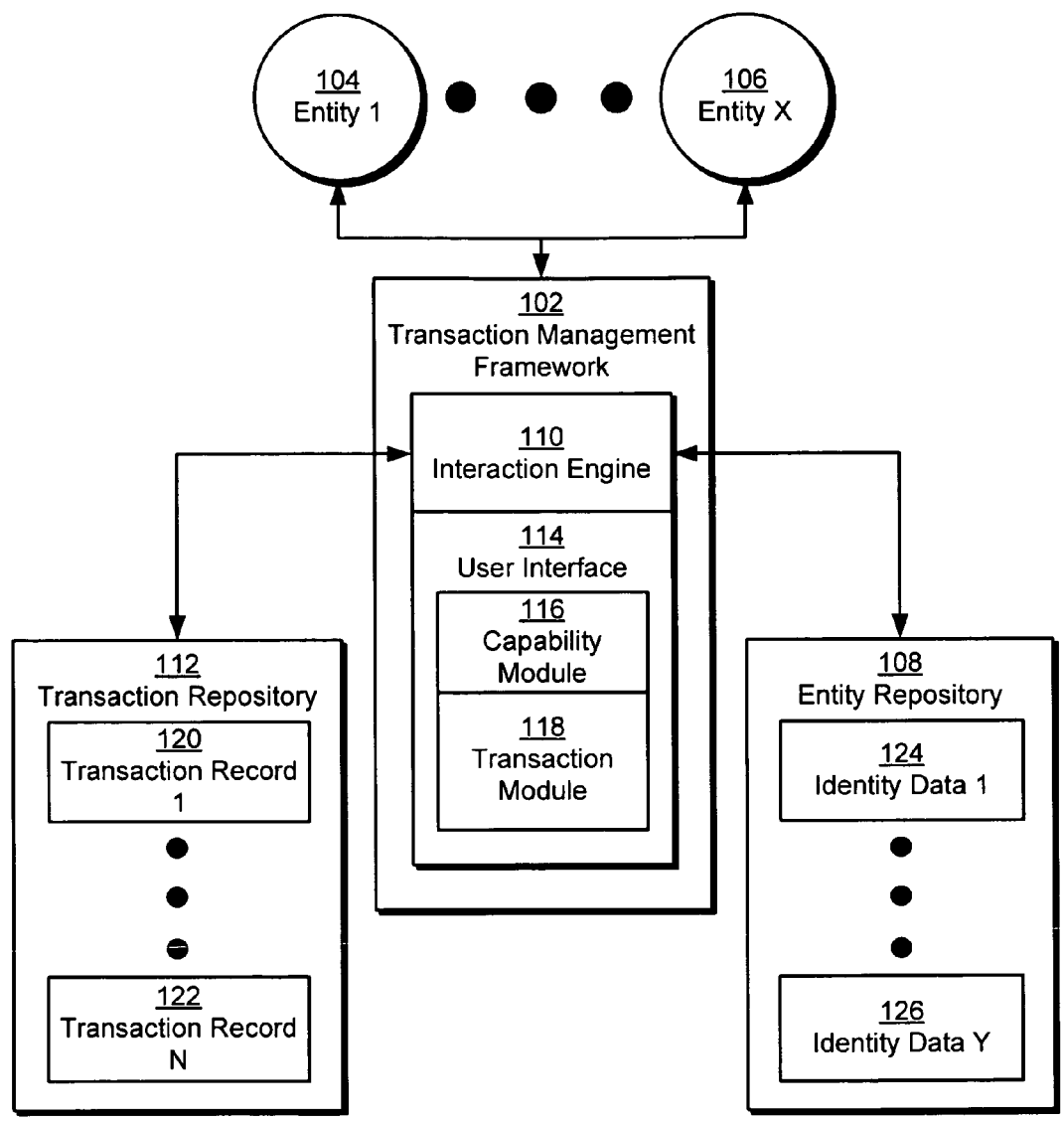
FIG. 1 shows a schematic of a system in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Embodiments provide a method and system for facilitating electronic transactions between entities. Entities involved in the electronic transactions may correspond to customers, vendors, healthcare providers, healthcare recipients, individuals, businesses, and/or organizations. Electronic transactions may correspond to financial transactions, healthcare transactions, business transactions, and/or other record-based transactions.

To facilitate the electronic transactions, potential interaction between the entities may be discovered by examining one or more transaction records between the entities, identifying transaction patterns associated with the entities, and/or verifying an entity identity of one of the identities. Next, a set of shared electronic transfer capabilities between the entities may be verified and/or enabled. Finally, the electronic transactions may be facilitated by notifying one or more of the entities of the shared electronic transfer capabilities. The electronic transactions may additionally be facilitated by carrying out the electronic transactions between the entities.

FIG. 1 shows a schematic of a system in accordance with an embodiment. As shown in FIG. 1, the system includes a transaction management framework 102, an entity repository 108, and a transaction repository 112. Each of these components is described in further detail below.

Transaction management framework 102 may be used to manage transactions for one or more entities (e.g., entity 1 104, entity x 106). Transactions may include, for example, financial transactions such as bill payments, purchases, refunds, payroll, and/or other monetary or financial exchanges; healthcare transactions such as insurance payments and disputes, prescription processing, and/or appointments; business transactions such as contract negotiations, orders, tax filings, and/or audits; and/or other record-based transactions. Entities may correspond to parties involved in the transactions, such as customers, vendors, healthcare providers, healthcare recipients, individuals, businesses, and/or organizations.

In one or more embodiments, transaction management framework 102 is implemented using a client-server architecture. More specifically, transaction management framework 102 may be executed on one or more servers. In addition, transaction management framework 102 may be accessed from other machines using a web browser and network connection. In other words, transaction management framework 102 may be implemented using a cloud computing system that is accessed over the Internet. Alternatively, some of transaction management framework 102 (e.g., user interface 114) may be locally installed on a computing system, such as a personal computer (PC), mobile phone, personal digital assistant (PDA), and/or other digital computing device of each entity.

In one or more embodiments, transaction management framework 102 corresponds to a product and/or a service that allows each entity to view and access transaction records (e.g., transaction record 1 120, transaction record n 122). In other words, transaction management framework 102 may obtain transactions records of transactions from the entities and/or sources associated with the entities (e.g., financial institutions, healthcare organizations, business partners, etc.). For example, financial transaction records for an entity may be entered into transaction management framework 102 by the entity and/or obtained from financial institutions associated with the entity using mechanisms such as interfaces with the financial institutions, web-scraping methods on websites of the financial institutions, and/or financial exchange protocols (e.g., Open Financial Exchange (OFX)). Transaction management framework 102 may additionally store the transaction records in transaction repository 112 for subsequent retrieval and use. For example, transaction management framework 102 may use one or more transaction records to assist an entity with budgeting, accounting, personal finance, healthcare management, business management, and/or other tasks associated with the transaction records.

Furthermore, transaction management framework 102 may assist entities with managing and/or performing transactions. For example, transaction management framework 102 may provide a user interface 114 (e.g., graphical user interface (GUI), web-based interface, etc.) that allows an entity to generate, track, and/or maintain documents (e.g., bills, invoices, agreements, claims, etc.) associated with paper-based transactions. Transaction management framework 102 may also facilitate communication between entities involved in transactions. For example, transaction management framework 102 may store identity data (e.g., identity data 1 124, identity data y 126) associated with entities in entity repository 108. The identity data may include contact information (e.g., address, phone number, email address, etc.) for each entity involved in transactions through transaction management framework 102. Furthermore, the identity data may be used by the entities to communicate while performing transactions with one another. For example, a vendor may look up the address for a customer from entity repository 108 to mail an invoice to the customer.

In one or more embodiments, the identity data is obtained from the entities during enrollment with transaction management framework 102 and/or use of transaction management framework 102. On the other hand, the identity data may be obtained from transaction records in transaction repository 112 and/or from publicly available records, such as public listings for individuals, businesses, and organizations. As a result, entity repository 108 may include identity data for entities that do not use transaction management framework 102.

Transaction management framework 102 may also facilitate electronic transactions between entities. In particular, transaction management framework 102 may carry out electronic transactions between entities in lieu of slower and/or less efficient paper-based transaction. For example, transaction management framework 102 may perform electronic transactions such as bill payments, payroll processing, purchases, refunds, insurance claim filing, and/or record updating for one or more entities involved in the electronic transactions. However, the frequent or widespread use of electronic transactions may be hindered by the inability of entities to ascertain each other's electronic transfer capabilities. Furthermore, entities lacking electronic transfer capabilities may not know how to enable electronic transactions with other entities, or may not know that electronic transactions are available at all.

To assist entities in transitioning from paper-based transactions to electronic transactions, an interaction engine 110 in transaction management framework 102 may include functionality to assess potential interaction between the entities and verify shared electronic transfer capabilities between the entities. If electronic transactions are enabled between the entities, the electronic transactions may be facilitated by notifying one or more of the entities of the shared electronic transfer capabilities, as discussed below.

In one or more embodiments, interaction engine 110 may discover potential interaction between a set of entities by examining transaction records between the entities, identifying transaction patterns associated with the entities, and/or verifying an entity identity of one of the entities. More specifically, interaction engine 110 may determine that potential interaction may exist between the entities based on past interaction found in transaction records from transaction repository 112. If no explicit transaction record exists between the entities, interaction engine 110 may examine the transaction records in transaction repository 112 and/or other transaction-based data to determine transaction patterns associated with certain types of entities. For example, interaction engine 110 may find potential interaction between a healthcare provider and a healthcare recipient based on transaction patterns that indicate a high likelihood of interaction if the healthcare provider provides services that are sought by the healthcare recipient, is within a certain radius of the healthcare recipient, and is in the network of the healthcare recipient's healthcare insurance.

Interaction engine 110 may also verify an entity identity in a potential interaction if the entity identity is not known from previous analysis of transaction records and/or transaction patterns. For example, interaction engine 110 may discover potential interaction from transaction records associated with an entity that uses transaction management framework 102. However, if the transactions denoted by the transaction records are performed outside of transaction management framework 102, other entities involved in the transactions may not be easily identified just from the transaction records. In particular, such entities may not use transaction management framework 102 and/or may be recognized under a different set of identifiers (e.g., names) from the entities listed in the transaction records.

To verify an entity identity of an entity, interaction engine 110 may compare transaction records from transaction repository 112 with identity data from entity repository 108. The entity identity may then be verified by matching information found in the transaction records with the identity data. For example, transaction records between a known entity and an unidentified entity may include the unidentified entity's name, address, phone number, and/or identification number (e.g., Social Security Number (SSN), Employer Identification Number (EIN)). However, the unidentified entity may not be immediately recognized because the transaction records may not explicitly link two entities in entity repository 108, the unidentified entity may exist under a different name in entity repository 108, and/or the unidentified entity may not use transaction management framework 102.

Consequently, interaction engine 110 may attempt to verify the entity identity of the unidentified entity using the entity's address, phone number, identification number, and/or other identifying information found in the transaction records. If a match between the identifying information and identity data in entity repository 108 is found, interaction engine 110 may update the transaction records with the newly identified entity. Interaction engine 110 may also note the potential interaction between the two entities under their entries (e.g., identity data) in entity repository 108. For example, interaction engine 110 may record the potential interaction by enabling database joins between transaction records of transactions in transaction repository 112 and identity data for the newly identified entity in entity repository 108. The verified entity identity may then be used to determine the entity's electronic transfer capabilities and/or to facilitate electronic transactions for the entity.

Once potential interaction is established between the entities, interaction engine 110 may verify a set of shared electronic transfer capabilities between the entities. To verify the shared electronic transfer capabilities, interaction engine 110 may first determine the individual electronic transfer capabilities of each entity and then compare the electronic transfer capabilities of the entities to determine if electronic transactions are enabled between the entities. In one or more embodiments, the entity's electronic transfer capabilities are obtained from the entity's use of transaction management framework 102 and/or from previous electronic transactions associated with the entity. For example, the entity may be authorized to use one or more electronic transfer capabilities through transaction management framework 102, or the entity may be involved in a set of electronic transactions that have corresponding transaction records in transaction repository 112. Moreover, each entity's known electronic transfer capabilities may be stored as part of the entity's identity data in entity repository 108 and used by interaction engine 110 to verify shared electronic transfer capabilities between different sets of entities.

If the set of shared electronic transfer capabilities is sufficient to perform electronic transactions between the entities, electronic transactions between the entities may be facilitated by notifying the entities of the shared electronic transfer capabilities. However, if one of the entities lacks an electronic transfer capability required to perform electronic transactions, a capability module 116 within user interface 114 may enable the electronic transfer capability for the entity. For example, capability module 116 may allow the entity to enroll in a service providing the electronic transfer capability and/or provide guidance to the entity for enabling the electronic transfer capability. The shared electronic transfer capabilities may thus be verified in some embodiments by enabling one or more of the shared electronic transfer capabilities for an entity.

To facilitate electronic transactions between entities with potential interaction and shared electronic transfer capabilities, a transaction module 118 in user interface 114 may notify one or more of the entities of the shared electronic transfer capabilities. For example, transaction module 118 may provide the notification as an email, instant message, pop-up, text message, voicemail, and/or other communications mechanism available through user interface 114. Furthermore, the notification may be made upon enrollment with transaction management framework 102 by one of the entities, upon an attempt to interact between the entities, and/or upon receiving a transaction record associated with the entities. For example, transaction module 118 may notify an entity of shared electronic transfer capabilities with another entity when the entity first attempts to conduct, manage, and/or record a transaction with the other entity using transaction management framework 102. Upon receiving the notification, the entities may begin conducting electronic transactions instead of paper-based transactions.

As mentioned previously, the electronic transactions may also be carried out using transaction management framework 102. As a result, transaction module 118 may also include functionality to obtain, format, process, and/or transmit information required to carry out each electronic transaction. For example, transaction module 118 may execute a purchase between a customer and a vendor by obtaining an order for types and quantities of goods to be purchased from the customer and electronically sending the order to the vendor. Upon approval of the order, transaction module 118 may bill the customer for the cost of the purchase and transfer the funds from the customer's account to the vendor's account (e.g., using one or more financial exchange protocols). Finally, transaction module 118 may electronically document a completion of the purchase in a transaction record stored in transaction repository 112.

Figure 2:
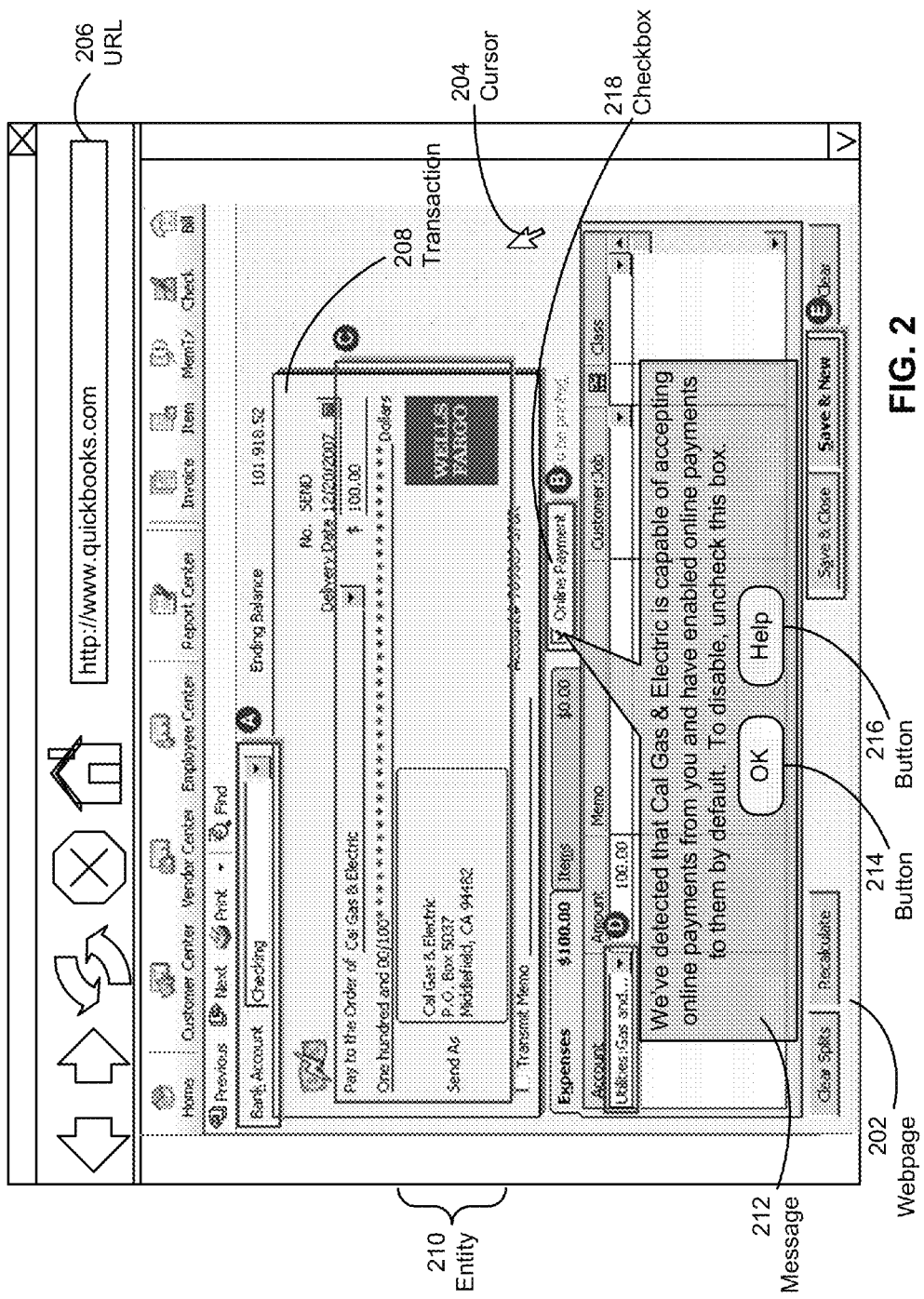
FIG. 2 shows an exemplary screenshot in accordance with an embodiment.

FIG. 2 shows an exemplary screenshot in accordance with an embodiment. More specifically, FIG. 2 shows a screenshot of a web-based user interface for facilitating electronic transactions. As shown in FIG. 2, the web-based user interface is provided by a webpage 202 within a web browser. Furthermore, webpage 202 may be obtained from a Universal Resource Locator (URL) 206 by the web browser. In particular, webpage 202 may correspond to a transaction module (e.g., transaction module 118 of FIG. 1) that facilitates electronic transactions for a user of a transaction management website. The transaction module and/or transaction management website may additionally correspond to the web-based user interface of a transaction management framework (e.g., transaction management framework 102 of FIG. 1) that allows the user to record, manage, and/or track his/her transactions.

Webpage 202 includes a transaction 208 to be performed between the user of webpage 202 and an entity 210 (e.g., "Cal Gas & Electric"). For example, transaction 208 may correspond to a bill payment between the user and entity 210. As described above, transaction 208 may correspond to a paper-based transaction involving the physical transmission of documents between the user and entity 210. Alternatively, transaction 208 may correspond to an electronic transaction that is set up through webpage 202 and carried out on the user's behalf by the transaction management framework.

As mentioned previously, the transaction module corresponding to webpage 202 may include functionality to facilitate electronic transactions by discovering entities (e.g., entity 210) with shared electronic transfer capabilities and notifying one of more of the entities of the shared electronic transfer capabilities. As shown in FIG. 2, webpage 202 includes a message 212 that notifies the user of shared electronic capabilities between the user and entity 210 (e.g., "We've detected that Cal Gas & Electric is capable of accepting online payments from you and have enabled online payments to them by default. To disable, uncheck this box."). The message may be displayed to the user upon discovering potential interaction between the user and entity 210 is discovered, identifying entity 210, and/or verifying shared electronic transfer capabilities between the user and entity 210.

Potential interaction may be established between the user and entity 210 based on transaction records between the user and entity 210. For example, the transaction management website may include records of previous bill payments from the user to entity 210. The previous bill payments may be performed through the transaction management website, or the previous bill payments may be made through another transaction mechanism and recorded on the transaction management website. Alternatively, the potential interaction may be based on the generation of transaction 208 by the user. For example, transaction 208 may correspond to the first bill payment sent to entity 210 through the transaction management website and/or the first bill payment recorded on the transaction management website.

Entity 210 may also be identified prior to the display of message 212. For example, entity 210 may be listed under different names in transaction 208 and the transaction management website. As a result, entity 210 may not be recognizable under the name used in transaction 208 (e.g., "Cal Gas & Electric") and may instead be identified from transaction 208 using an address (e.g., "P.O. Box 5037, Middlefield, Calif. 94482"), EIN, and/or other identifying information associated with entity 210. The entity identity of entity 210 may thus be confirmed based on information entered by the user through webpage 202, identity data available to the transaction management website, and/or previous transaction records associated with entity 210.

Finally, shared electronic transfer capabilities between the user and entity 210 may be established based on the use of the transaction management website by the user and/or entity 210, as well as previous electronic transactions performed by the user and/or entity 210. For example, the transaction management website may include a list of electronic transfer capabilities for the user and/or entity 210 that are enabled through the transaction management website. The electronic transfer capabilities of the user and/or entity 210 may also be based on previous electronic transactions involving the user and/or entity 210. For example, the transaction management website may determine that entity 210 is capable of receiving online bill payments based on previous online bill payments to entity 210 from other users of the transaction management website.

The user may acknowledge message 212 by selecting a button 214 (e.g., "OK") using a cursor 204, keyboard, and/or other input mechanism available through webpage 202. The user may also select a button 216 (e.g., "Help") to find out more information regarding electronic transactions associated with entity 210 and/or the transaction management website. Furthermore, the user may unselect a checkbox 218 (e.g., "Online Payment") to disable electronic transactions with entity 210, or the user may allow checkbox 218 to remain selected to enable electronic transactions with entity 210 through webpage 202 and/or other portions of the transaction management website. In other words, webpage 202 and/or the transaction management website may facilitate electronic transactions for the user both by notifying the user of the availability of the electronic transactions with entity 210 and by performing the electronic transactions between the user and entity 210.

Figure 3:
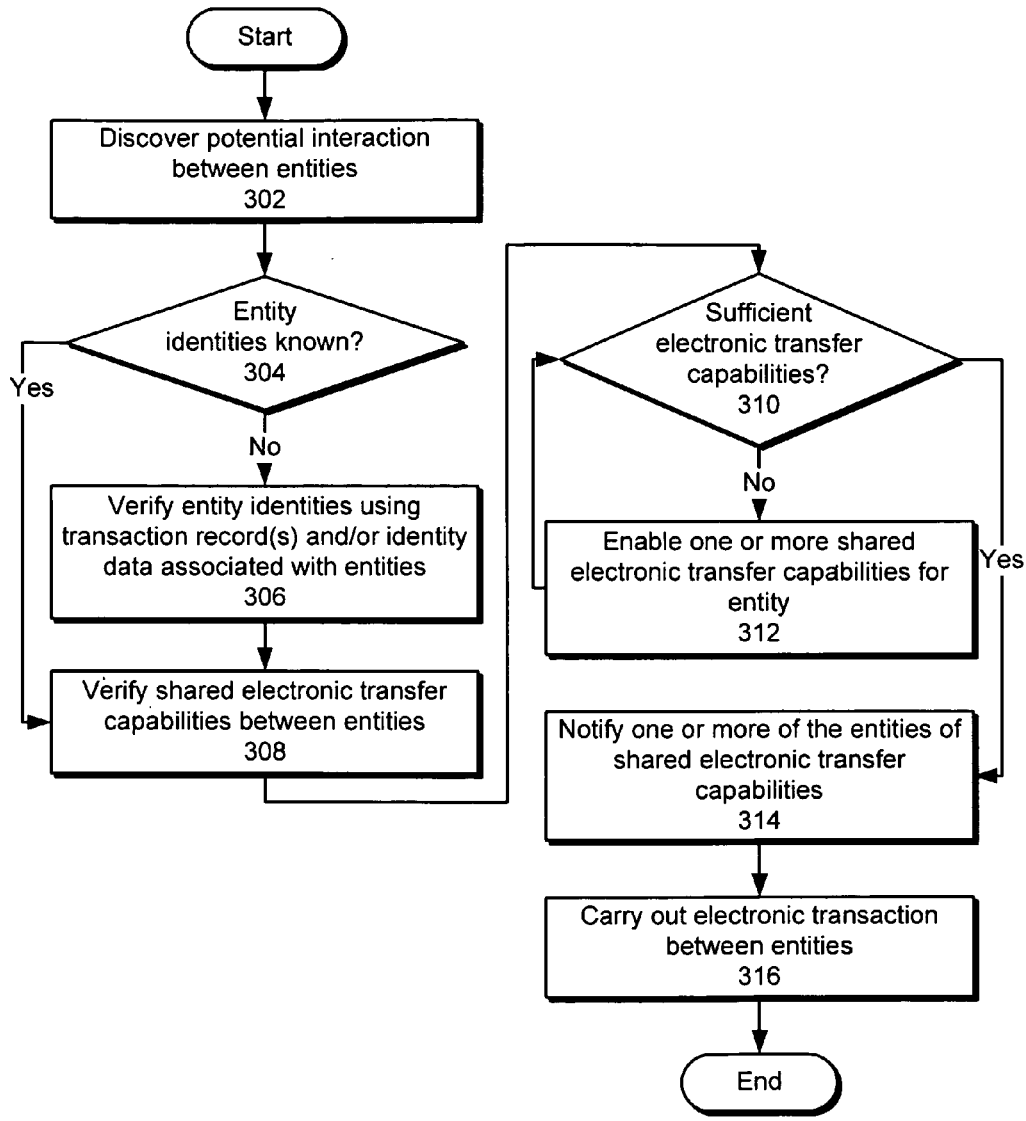
FIG. 3 shows a flowchart illustrating the process of facilitating an electronic transaction between a set of entities in accordance with an embodiment.

FIG. 3 shows a flowchart illustrating the process of facilitating an electronic transaction between a set of entities in accordance with an embodiment. In one or more embodiments, one or more of the steps may be omitted, repeated, and/or performed in a different order. Accordingly, the specific arrangement of steps shown in FIG. 3 should not be construed as limiting the scope of the embodiments.

Initially, potential interaction is discovered between the entities (operation 302). The potential interaction may correspond to a potential financial transaction, business transaction, healthcare transaction, and/or other record-based transaction. The potential interaction may be discovered by examining one or more transaction records between the entities and/or identifying transaction patterns between the entities. For example, the potential interaction may be based on previous interaction found in the transaction record(s) and/or transaction patterns between other entities that suggest a strong likelihood of interaction between the entities.

Establishing a potential interaction between the entities may further require that the entity identities are known (operation 304). If the entity identities are known from other analyses of potential interaction (e.g., transaction records), the entity identities do not require verification. However, if one or more entity identities are unknown, the unknown entity identities may be verified using the transaction record(s) and/or identity data associated with the entities (operation 306). For example, an entity identity from a transaction record may be established by matching the entity's address, identification number, and/or other identifying information from the transaction record with identity data and/or public records associated with the entity.

A set of shared electronic transfer capabilities between the entities is then verified (operation 308). The shared electronic transfer capabilities may be verified using the identity data for the entities and/or previous electronic transactions in which the entities were involved. The shared electronic transfer capabilities may indicate that the entities are capable of conducting electronic transactions with one another. As a result, verification of the shared electronic transfer capabilities may involve ensuring that each entity has sufficient electronic transfer capabilities (operation 310) to conduct electronic transactions. If one or more of the electronic transfer capabilities are lacking in an entity, the deficient shared electronic transfer capabilities are enabled for the entity (operation 312) until all entities have sufficient electronic transfer capabilities.

To facilitate electronic transactions between the entities, one or more of the entities is notified of the shared electronic transfer capabilities (operation 314). For example, a message, text message, instant message, voicemail, email, and/or other communications mechanism may be used to notify the entities of the shared electronic transfer capabilities. The electronic transactions may further be facilitated by carrying out the electronic transactions between the entities (operation 316). For example, the electronic transactions may be carried out by sending and receiving information related to the electronic transactions between the entities, generating electronic records corresponding to the electronic transactions, and/or executing the electronic transactions using one or more electronic communications protocols (e.g., networking protocols, financial exchange protocols, healthcare exchange protocols).

Figure 4:
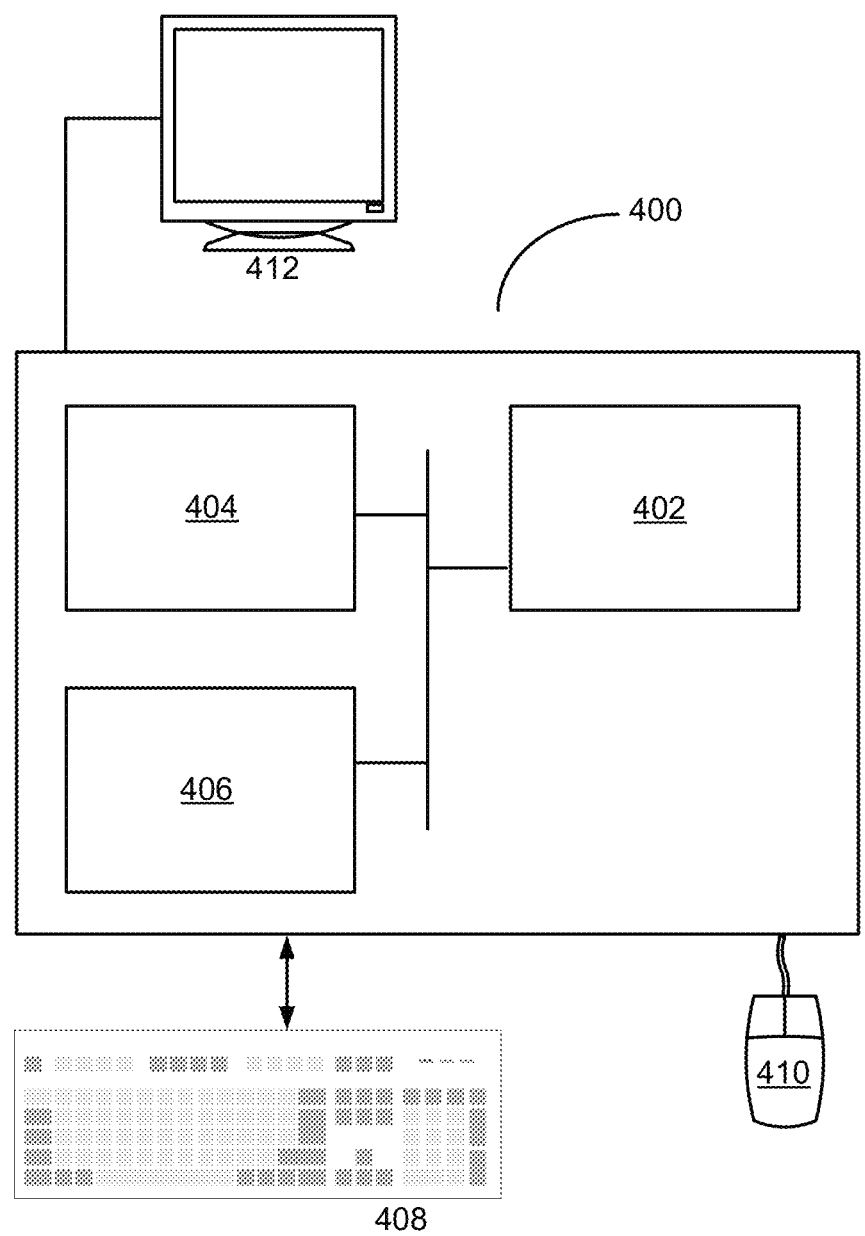
FIG. 4 shows a computer system.

FIG. 4 shows a computer system 400. Computer system 400 includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In particular, computer system 400 may implement a transaction management framework that facilitates electronic transactions between a set of entities. The transaction management framework may include an interaction engine that discovers potential interaction between the entities and verifies a set of shared electronic transfer capabilities between the entities. Computer system 400 may also include a transaction repository that stores transaction records used to discover the potential interaction, as well as an entity repository that stores identity data used to verify the entity identity of one or more of the entities. The transaction management framework may also provide a capability module that enables one or more of the shared electronic transfer capabilities for one of the entities and a transaction module that facilitates the electronic transactions by notifying one or more of the entities of the shared electronic transfer capabilities.

In addition, one or more components of computer system 400 may be remotely located and connected to the other components over a network. Portions of the present embodiments (e.g., interaction engine, transaction repository, entity repository, capability module, transaction module, etc.) may also be located on different nodes of a distributed system that implements the embodiments. For example, the present embodiments may be implemented using a cloud computing system that provides a transaction management framework to facilitate electronic transactions between entities.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating an establishment of an electronic financial transaction between a set of entities, comprising:
   discovering, by computer, a potential interaction between a first entity and a second entity, wherein the potential interaction is a record-based transaction, and wherein discovering the potential interaction involves one of: examining one or more transaction records between the first entity and the second entity, and identifying transaction patterns between the first entity and the second entity;
   determining, by computer, if the first entity and the second entity are known entities from previous transactions;
   in response to determining that the first entity and the second entity are not known entities from previous transactions, verifying, by computer, the first entity and the second entity by analyzing one of: transaction records associated with the first entity and the second entity, and identity data associated with the first entity and the second entity;
   determining, by computer, if a set of shared electronic financial transfer capabilities between the first entity and the second entity exist;
   in response to determining that a set of shared electronic financial transfer capabilities between the first entity and the second entity do not exist, enabling, by computer, an electronic financial transfer capability on at least one of the first entity and the second entity;
   notifying, by computer, the first entity and the second entity of the shared electronic financial transfer capability; and
   carrying out, by computer, the electronic financial transaction between the first entity and the second entity.

* * * * *